No. 616,846. Patented Dec. 27, 1898.
S. O. JOHNSON.
CONVERTIBLE LAWN MOWER AND TRIMMER.
(Application filed July 26, 1897.)
(No Model.)
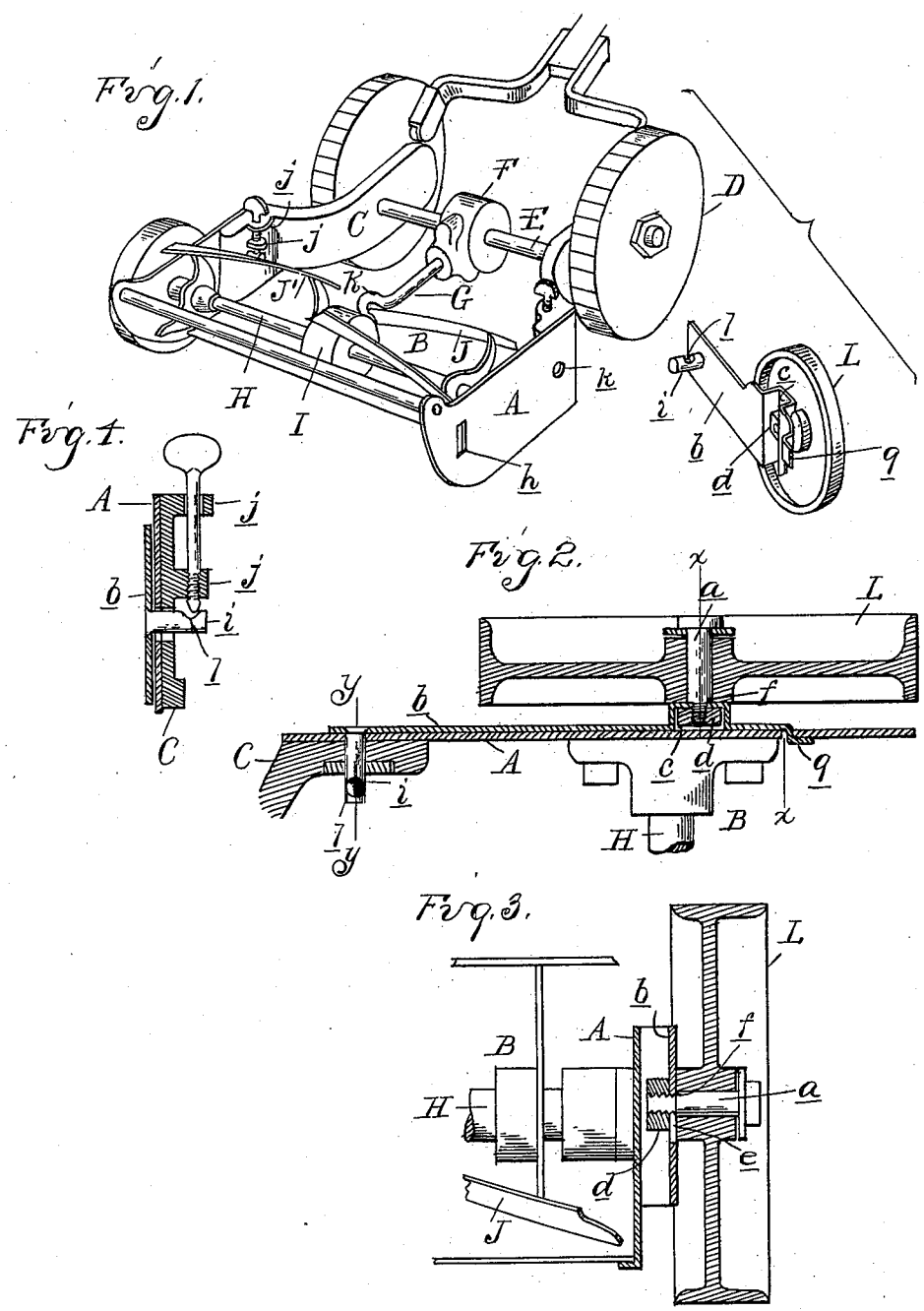
Witnesses
Inventor
Stephen O. Johnson
By Attys.

UNITED STATES PATENT OFFICE.

STEPHEN O. JOHNSON, OF DETROIT, MICHIGAN.

CONVERTIBLE LAWN MOWER AND TRIMMER.

SPECIFICATION forming part of Letters Patent No. 616,846, dated December 27, 1898.

Application filed July 26, 1897. Serial No. 645,937. (No model.)

*To all whom it may concern:*

Be it known that I, STEPHEN O. JOHNSON, a citizen of the United States, residing at Detroit, in the county of Wayne and State of Michigan, have invented certain new and useful Improvements in Convertible Lawn Mowers and Trimmers, of which the following is a specification, reference being had therein to the accompanying drawings.

My invention is designed as an improvement on the style of lawn-mowers described in United States Letters Patent Nos. 519,860 and 525,388 and in the application for United States Letters Patent, Serial No. 594,475. In all of these lawn-mowers the ground-wheel or ground-wheels, which impart motion to the knives, are located in rear thereof, the arrangement being such that the knives are adapted to cut the full width of the machine for the purpose of cutting the grass close to the edges of borders, walks, or fences, accomplishing the work of cutting and trimming the lawn with the same machine and distinguishing it thereby from the ordinary styles of lawn-mowers, where the wheels run outside the knives and interfere with the operation of trimming. I have found, however, that for the purpose of a perfect mower it is most advantageous to have the knives supported in relation to the ground by ground-wheels placed outside and in line with the knives, whereby the knives are properly guided in passing over uneven ground.

The object of my invention is to obtain this advantage with the above-described style of mower in such a manner that it combines the advantage of a perfect mower and that of a trimmer in one machine; and to this end my invention consists in a certain construction and arrangement of parts whereby the lawn-mower is convertible from one form in which it is essentially adapted for perfect mowing to another form in which it constitutes more essentially a lawn-trimmer, all as more fully hereinafter described, and shown in the drawings, in which—

Figure 1 is a perspective view of my improved convertible lawn mower and trimmer with one of the front supporting-wheels detached and shown separate. Fig. 2 is a horizontal section through one of the side plates of the frame with the front supporting-wheel attached thereto. Fig. 3 is a vertical cross-section on line $x\ x$, Fig. 2. Fig. 4 is a vertical cross-section on line $y\ y$ in Fig. 2.

My invention is in the nature of an attachment to the above-described type of lawn-mower, and is particularly shown in the drawings as applied to the lawn-mower which forms the subject-matter of the application for Letters Patent, Serial No. 594,475. The lawn-mower has a frame which is formed with two parallel side plates A, between which is journaled the rotary knife-head B. These side plates are secured to rearwardly and inwardly extending brackets C, which thus form a sufficient contraction of the frame to afford room on the outside of the brackets for two drive-wheels D within the space cut by the knives. These drive-wheels by means of intermediate gears impart motion to a transverse shaft inclosed by the hollow frame-bar E, and from the center of this shaft motion is transmitted through intermediate gear inclosed in the enlargement F of the frame to a shaft G, running forward in the center of the frame and revolving the shaft H of the knife-head through intermediate gear inclosed in the housing I. The knife-head has two sets of knives J J', which are staggered in relation to each other, and the shaft G has a crook K, whereby the knives (which overlap the center) and the crook, which revolves with the shaft G, dodge each other, the crook passing around the end of each knife just at the moment of passing each other. The knives thus cut clear across to the full width of the mower, making it especially adapted for trimming as well as cutting lawns. However, the frame of the mower not being supported in front upon the ground it will be seen that the cutting of rough or uneven lawns will obviously not be as perfect as with mowers which have the knife placed between supporting-wheels which guide the knife-head always in proper relation to the ground over which it travels, while ground-supports placed in rear of the knife will often guide it wrongly. To overcome this disadvantage, I support the front end of the frame upon ground-wheels L, placed in line with the revolving knife-head. Each wheel is secured by a bolt $a$ to a plate $b$ in such manner that the bolt forms a stub-axle upon which the wheel is free to revolve. The plate $b$ is of sheet metal formed with a vertical recess $c$ upon the inside adapted to receive the nut $d$ of the bolt and with a vertical slot $e$ for the screw-threaded end of the bolt to pass through and seat its shoulder $f$ against the plate, whereby the bolt is secured in position on the plate $b$ vertically adjustable. The plate $b$ at its forward end has a tongue $g$, adapted to engage with a slot $h$ in the plate A, and at its rearward end it has a stud $i$, which is adapted to be engaged in the orifice $k$ in the plate A. On the inside the plate A is provided with lugs $j j$, through which the clamping-screw $k$ is screw-threaded. The lower end of this clamping-screw is conically reduced, and a corresponding seat $l$ for it is formed on the stud $i$. By means of this construction the wheels L can be readily put on or taken off, and it requires but a few seconds to convert it from its use as a perfect mower with the wheels L on into a perfect trimmer with the wheels off, and often it will not be necessary to take more than one wheel off, if the trimming is to be done only on one side. With this attachment for converting the trimmer into a lawn-mower the use of a ground-roller is entirely dispensed with, which not only makes the mower run easier, but increases its usefulness as a trimmer, as the operator can by depressing or raising the handle raise or lower the revolving knife-head as circumstances may require for doing perfect work.

What I claim as my invention is—

1. In a convertible lawn mower and trimmer the combination of a frame comprising forwardly-extending side plates having flat unobstructed outer faces, ground-wheels supporting said frame, a cutter-head between said forwardly-extending side plates, actuating mechanism for the cutter-head located between the side plates, auxiliary supporting-wheels and means for detachably securing the same on the outer sides of said side plates.

2. In a convertible lawn mower and trimmer the combination of drive-wheels, a frame supported at the rear by said drive-wheels and having forwardly-extending side plates having flat unobstructed outer faces and located laterally outside of the drive-wheels, a cutter-head located between said side plates, drive mechanism therefor intermediate said side plates, auxiliary supporting-wheels, plates carrying said supporting-wheels, and means for detachably securing the wheel-supporting plates on the outside of said side plates.

3. In a convertible lawn mower and trimmer, the combination of the supporting-frame the forwardly-extending side plates thereof, the drive-wheels supporting the rear end of the frame, the handle-bar, the rotary cutter-head mounted between the forward ends of the side plates, drive connections from the drive-wheels to the cutter-head located between the side plates the plates $b$ detachably secured to said side plates, the bolts $a$ vertically adjustably secured to the plates $b$ and the auxiliary ground-wheels L journaled upon said bolts.

4. In a convertible lawn mower and trimmer, the combination of drive-wheels, a frame supported at the rear by said wheels and having forwardly-extending flat side plates, provided with apertures $h$ and $k$, auxiliary supporting-wheels, plates on which the latter are mounted provided each with a tongue and a stud adapted to enter said apertures $h$ and $k$, and securing devices mounted on the inside of the frame side plates and adapted to engage with said studs.

In testimony whereof I affix my signature in presence of two witnesses.

STEPHEN O. JOHNSON.

Witnesses:
OTTO F. BARTHEL,
M. B. O'DOGHERTY.